United States Patent Office 3,130,171
Patented Apr. 21, 1964

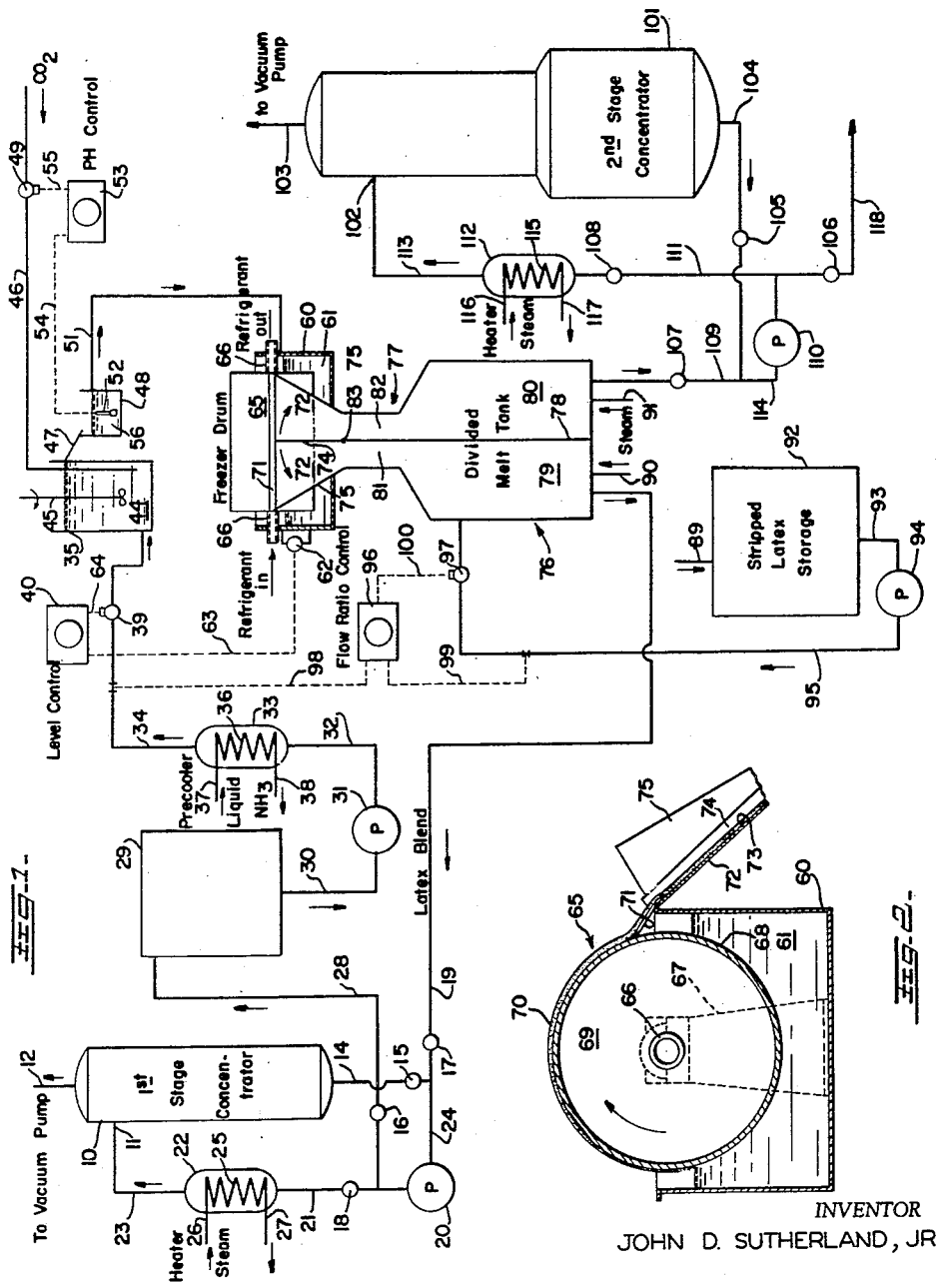
INVENTOR
JOHN D. SUTHERLAND, JR.

3,130,171
PROCESS FOR PREPARING FAST GELLING SYNTHETIC RUBBER LATEX AND PRODUCT
John D. Sutherland, Jr., Baton Rouge, La., assignor to Copolymer Rubber & Chemical Corporation, a corporation of Louisiana
Filed Mar. 18, 1959, Ser. No. 800,319
12 Claims. (Cl. 260—2.5)

This invention broadly relates to the preparation of synthetic rubber latex and, in one of its more specific aspects, to a novel low temperature polymerization process for the preparation of synthetic rubber latex characterized by a relatively fast gelling time. The invention further relates to the synthetic rubber latex product prepared in accordance with the process of the invention.

This application is a continuation-in-part of my co-pending application Serial No. 679,849, filed August 23, 1957, for "Treatment of Synthetic Rubber Latex."

In many industrial processes using synthetic rubber latex for the manufacture of rubber articles, it is desirable that the latex have a sufficiently low viscosity at a given high solids content such as 60% TSC or higher so as to allow ready processing. Within reasonable limits, usually the higher the solids content and the lower the viscosity the more desirable the latex. The viscosity of a specific latex at a given temperature and solids content is largely determined by the average particle size and distribution of particle size. It is generally accepted that a large average particle size and a wide uniform distribution of particle size are desirable and result in lower viscosity at a given solids content and temperature. As the solids content is increased, the viscosity of a specific latex of a given average particle size and distribution of particle size increases and especially at higher solids content.

Still another important consideration is the mechanical stability of the latex. If the latex does not exhibit good mechanical stability properties, then a substantial proportion will irreversibly coagulate during normal handling and storage prior to use.

Large quantities of synthetic rubber latex are used in manufacturing foamed-latex sponge rubber. Foamed-latex sponge rubber is usually prepared by the Dunlop process or the more modern process involving use of an Oakes machine. In the Dunlop process, latex and various compounding ingredients are subjected to agitation in a mixer, such as in a Hobart mixer when operating on a laboratory scale, to thereby generate latex foam. In the more modern process feeds, of latex, various compounding ingredients and air are metered into an internal mixer such as an Oakes machine, the ingredients agitated under pressure and the resulting foam withdrawn from the machine. Shortly before the agitation cycle is completed in the Dunlop process or immediately before withdrawing the foam from the Oakes machine, a delayed action gelling agent such as sodium silicofluoride is added. The foam is poured into molds where it gels or coagulates into a solid mass after expiration of a period of time which is largely determined by the characteristics of the specific foamed latex, the amount of gelling agent added and the presence or absence of a sensitizer for the gelling agent. The gelling time for a given foamed latex is important to manufacturers of foamed-latex sponge rubber articles since the period of time a mold is in use to produce an article is directly related thereto. Thus, within reasonable limits and so long as a quality product is being produced usually the shorter the gel time the more satisfactory the latex when all other factors are equal. This is due to the increase in production rate which is possible when using fast gelling latex as well as other reasons.

The gelling time of a specific latex may be decreased to some extent by adding additional quantities of the delayed action gelling agent. However, the degree of possible improvement in gelling time by this method is limited since other problems arise and an unsatisfactory product is produced. For example, if too much gelling agent is added the foam may collapse in the molds prior to proper gelation, serum released after partial gelation of foam in the upper portion of the mold and is then free to drain to the bottom of the mold, and often there is loose skin formation. Therefore, addition of large quantities of gelling agent is to be avoided. Still another method of reducing the gelling time of a specific latex is by assuring the presence of a sensitizer for the sodium silicofluoride such as diethylene triamine. While the use of such a gelling time sensitizer will allow faster gelling times, disadvantages are also present. For example there is a tendency toward gradual gelation of the foam as distinguished from sudden, hard gelation which is characteristic of sodium silicofluoride addition in the absence of a sensitizer. Also, the sensitizer often discolors the product and causes foam collapse or draining.

Due to the nature of the requirements for latex to be used in the manufacture of foamed-latex sponge rubber products, the industry has long experienced difficulty in providing a highly satisfactory synthetic rubber latex for this purpose. This is especially true of "cold rubber" latices prepared by low temperature polymerization processes. For example, synthetic rubber latex suitable for foamed-latex sponge rubber manufacture must have a high solids content, i.e., 55–60% TSC or higher such as up to about 65–70% TSC, and a sufficiently low viscosity to allow ease of handling and processing. In addition, the properties of the latex should be such as to provide a light colored product, a low foam density and a fast gelling time without collapse of the foam prior to proper gelation, draining of the serum, loose skin formation and other complications.

Many attempts have been made to prepare a low temperature, high solids synthetic rubber latex having outstanding properties for use in foamed-latex sponge rubber manufacture. One process presently used involves emulsion polymerization of polymerizable monomers, with or without suitable comonomers at low temperature and in an aqueous medium using a peroxamine-activated recipe for high solids content. The quantity of water used in such a recipe is kept at a minimum, as is the number of soap micelles serving as centers of polymerization. Thus, a relatively small number of particles of polymer are activated and the end result is an increase in the average particle size of the resulting latex. This procedure is not satisfactory for a number of reasons due to production problems arising when preparing the latex, among the more important being the extremely long reaction time required and the difficulty in controlling temperature, reaction rate and viscosity during polymerization. In addition, the viscosity of the end latex product is relatively high in many instances and a uniform, low viscosity, high solids latex product is difficult to prepare on a commercial scale. While the gelling time of this specific latex is fast due to the presence of the diethylene triamine in the activation system which acts as a gelling time sensitizer, there are a number of major disadvantages. Polymerization rates are slow, chemical costs are high since about 0.2 part of diethylene triamine and 0.3 part of diisopropylbenzene hydroperoxide or paramenthane hydroperoxide are required and the color of the dried latex film is very poor making it unsuitable for many applications where color is a significant factor. Also, the density of foam prepared from this type of latex is very high and there are the additional disadvantages pointed out above due to the presence of diethylene triamine which acts as a sensitizer for sodium silicofluoride. Regardless of its many disadvantages, low temperature, high solids latex prepared by a peroxamine activated recipe was generally considered to be the most satisfactory fast gelling latex of this type that was available to the industry prior to the present invention.

Recently, low temperature polymerization processes using a sulfoxylate-activated recipe have been developed for the production of low solids, small average particle size latex. When using a prior art sulfoxylate-activated recipe for preparing low solids latex, the abovementioned problems associated with the production of high solids latex by the peroxamine-activated recipe are not present. However, other disadvantages are present. The resulting low solids, small average particle size latex may not be concentrated to over about 35–45% TSC without encountering extremely high viscosities and prohibitive amounts of prefloc. When the same latex is partially agglomerated by freezing to a relatively large average particle size, the partially agglomerated latex then may be concentrated to a much higher solids content and the high solids latex product has a relatively low viscosity. Inasmuch as low solids, small average particle size latex may be prepared by a sulfoxylate-activated recipe in only a fraction of the time required for polymerization when using a peroxamine-activated recipe at high solids content and without the attendant production problems, such processes have been of considerable interest to the industry. One low temperature process for the partial agglomeration of a specific low solids SBR latex involves reducing the pH by means of carbon dioxide and then subjecting the latex to a freezing action for a short period of time at a temperature only moderately below the apparent freezing point of the latex, such as about 10° F. The partially agglomerated SBR latex thus produced may be concentrated to produce a high solids latex of reasonable viscosity. If it is desired to partially agglomerate the latex to an even larger average particle size and to thereby further improve the viscosity characteristics, the once frozen and thawed concentrated latex is refrozen and reconcentrated.

Attempts to adapt this process to the commercial production of low viscosity, high solids synthetic rubber latices did not result in an overall satisfactory process. For example, the once frozen and thawed latex product at a solids content of 60% TSC or higher tended toward an undesirably high viscosity. Even more important, when attempts were made to reduce the viscosity by refreezing and rethawing the once frozen and thawed latex, the stability was such that even when using relatively large amount of emulsifier excessive amounts of prefloc formed during the refreezing and rethawing steps. This made the process uneconomic in both utilization of monomers and emulsifier and in the necessity for frequent cleaning of the apparatus to remove prefloc. In addition, the viscosity of the end latex product at a given solids content could not be controlled effectively and it was impossible to produce continuously a high solids latex having a uniform viscosity.

It has been discovered that a low solids, small average particle size synthetic rubber latex may be agglomerated to a relatively large average particle size and then concentrated to produce a low viscosity, high solids synthetic rubber latex by a process overcoming the abovementioned problems and disadvantages which may comprise the steps of concentrating a blend of frozen and thawed agglomerated latex having a relatively large average particle size and latex having a relatively small average particle size in a first concentration step, agglomerating the latex blend to a relatively large average particle size by subjecting the same to a freezing action, thawing the frozen agglomerated latex blend, blending a portion of the frozen and thawed agglomerated latex blend with low solids synthetic rubber latex having a relatively small average particle size in quantities such as to improve the mechanical stability of the relatively small average particle size latex, passing at least a portion of the resulting latex blend to the first concentration step, and then concentrating a portion of the frozen and thawed agglomerated latex blend in a second concentration step to a desired solids content. While the above process will produce a low viscosity, high solids latex product when using a sulfoxylate-activated recipe which is highly satisfactory for most purposes it does have the disadvantage of a relatively long gelling time and thus it is not as satisfactory in this respect for the production of foamed-latex sponge rubber products as it might be. Prior to the present invention, efforts to produce a low temperature, fast gelling, high solids synthetic rubber latex have not met with success when using a sulfoxylate recipe or, for that matter by any low temperature polymerization process not using a gelling time sensitizer. Thus, the present invention is a major advance which overcomes the many disadvantages of the prior art.

It is an object of the present invention to provide a novel process for preparing synthetic rubber latex.

It is a further object of the present invention to provide a novel low temperature polymerization process for preparing synthetic rubber latex using a sulfoxylate-activated recipe wherein the resulting latex is characterized by a fast gelling time.

It is still a further object of the present invention to produce high solids synthetic rubber latex characterized by a fast gelling time wherein the latex is polymerized by a low temperature polymerization process using a sulfoxylate-activated recipe including a potassium and sodium-containing ingredients but no gel time sensitizing agent.

It is still a further object of the present invention to provide fast gelling latices produced in accordance with the process of the present invention.

It is still a further object of the present invention to provide an electrolyte and/or an emulsifier for use in preparing synthetic rubber latex by a low temperature polymerization process using a sulfoxylate-activated recipe.

It is still a further object of the present invention to provide a novel recipe for the preparation of fast gelling synthetic rubber latex by an emulsion polymerization process.

Still other objects of the present invention and the attendant advantages thereof will be apparent to those skilled in the art by reference to the following detailed description and the drawings, wherein:

FIG. 1 diagrammatically illustrates one suitable arrangement of apparatus for practicing the invention; and FIG. 2 is an enlarged side view in section of a freezer drum and freezer drum tank of a type suitable for freezing latex in accordance with the invention.

Referring now to FIG. 1, the first stage concentrator 10 is a prior art concentrator of a type suitable for thermally concentrating synthetic rubber latices. The first stage concentrator for example, may be of the essentially batch-type, as illustrated in the drawings, wherein the concentrator is charged batchwise with low solids latex, the latex charge recycled until concentrated to a desired higher solids content, and then the higher solids latex withdrawn batchwise from the concentrator; or the first concentration step may be of the essentially continuous-type wherein a stream of low solids latex is fed continuously at a controlled rate to a concentrator, the contents of the concentrator continuously recycled and a side stream of higher solids latex is withdrawn continuously at a controlled rate. The first stage concentrator 10 is provided with a feed inlet 11 in the upper portion thereof, an exhaust conduit 12 leading from the top of the concentrator to an exhaust means such as a vacuum pump (not shown), and a conduit 14 provided with valve 15 for withdrawing the contents. When charging the concentrator 10, the valves 15 and 16 are closed, and valves 17 and 18 are opened. A synthetic rubber latex blend is passed via conduit 19 to pump 20, and then forced by means of pump 20 through conduit 21, heater 22, conduit 23 and feed inlet 11 into concentrator 10. After introducing the desired quantity of latex blend into concentrator 10, valve 17 is closed, valve 15 opened and the latex charge continuously recycled through conduit 21, heater 22, conduit 23, concentrator 10, conduit 14 and portion 24 of conduit 19 by means of pump 20 until concentrated to a desired dry solids content. During the recycling step, a suitable heating fluid such as steam is supplied to and withdrawn from coil 25 in heater 22 by conduits 26 and 27, respectively, thereby continuously heating the latex blend. Also, concentrator 10 is maintained under a suitable reduced pressure such as 28 inches of mercury vacuum by suction on exhaust conduit 12, thus allowing a portion of the volatile contents (largely water) to evaporate. The vapors are withdrawn from the system via exhaust conduit 12. When the latex blend is concentrated to a desired dry solids content, such as about 55% TSC, valve 18 is closed, valve 16 is opened and the latex charge is withdrawn and transferred by means of pump 20 via conduit 28 to freezer feed tank 29.

The latex from the first concentration step is passed from freezer feed tank 29 via conduit 30 to pump 31, and forced by means of pump 31 through conduit 32, precooler 33 and conduit 34 into the lower portion of pH adjustment tank 35. A suitable cooling fluid such as liquid ammonia is supplied to an withdrawn from coil 36 in precooler 33 by conduits 37 and 38, respectively, for the purpose of precooling the latex to a desired temperature such as about 40° F. and thereby lowering the refrigerant requirement in the freezing apparatus to be described hereinafter. The flow rate of latex through conduit 34, i.e., the latex feed rate to tank 35, is controlled by means comprising level control valve 39 which is operated by level controller 40.

The pH adjustment tank 35 is provided with an agitator 45, conduit 46 and overflow spout 47 leading to container 48. Usually the pH of the latex feed to tank 35 is about 10 and the stability characteristics are such that the latex 44 in tank 35 should be destabilized sufficiently by a suitable method, such as by adjustment of pH, for more effective agglomeration by a freezing process. A suitable acidic substance such as carbon dioxide is fed via conduit 46 into the latex 44 contained in the lower portion of tank 35 at a feed rate controlled by means of control valve 49, the feed rate being such as to effect adjustment of the pH to a desired predetermined value such as 7.8 to 8.5. The carbon dioxide is added in a quantity sufficient to adjust the pH to a desired value, i.e., in a quantity such as to destabilize the latex sufficiently to result in effective agglomeration upon freezing, but not in an amount or manner such as to cause the formation of an objectionable amount of prefloc. The term agglomeration is used in the specification and claims to refer to an enlargement in the average particle size of the latex without sufficient enlargement of the particles to cause coagulation although small amounts of prefloc may be formed in some instances.

The container 48 is provided with an overflow conduit 51 and a pH electrode 52 positioned so as to be immersed in the latex 56. A pH controller 53 is operatively connected in a conventional manner with pH electrode 52 and control valve 49 by means of connections 54 and 55, respectively, for the purpose of measuring the pH of the latex overflowing from tank 35 and operating control valve 49 in response to changes in pH of the overflowing latex, thereby controlling the feed rate of substance within conduit 46 and in this manner maintaining the pH at a desired value.

After adjustment of pH, the latex is passed via conduit 51 to freezer drum tank 60. The latex 61 contained in freezer drum tank 60 is maintained at a desired operating level by means comprising level controller 40. The level controller 40 is operatively connected in a conventional manner with latex level sensitive means 62 and control valve 39 by means of connections 63 and 64, respectively and operates control valve 39 in response to changes in the level of latex within freezer drum tank 60. Inasmuch as the feed rate of latex to freezer drum 60 is determined by the rate of overflow from container 48, which in turn is determined by the rate of overflow from and the feed rate to tank 35, it is apparent that the latex level in freezer drum 60 may be readily controlled in this manner.

As best seen in FIG. 2, a freezer drum 65 is rotatably mounted in freezer drum tank 60 on hollow trunnions 66 supported by trunnion support means 67. It will be noted that the freezer drum 65 is so mounted in freezer drum tank 60 as to be partially submerged in latex 61. In addition to performing their usual function, as diagrammatically illustrated in FIG. 1, the hollow trunnions 66 serve as conduits for the passage of a suitable refrigerant such as liquid ammonia through the interior of freezer drum 65. Referring again to FIG. 2, with reference to the temperature of operation when following previously suggested practice for the agglomeration of latex by a freezing process, the rotating outer freezer drum surface 68 is maintained by means of refrigerant supplied to the drum interior 69 at a temperature sufficiently low so as to collect a film of latex 70 by a freezing action, but with the temperature being sufficiently high to prevent subcooling of the collected latex film to a temperature appreciably below its freezing point. As the freezer drum 65 rotates in a clockwise direction, the collected film of latex 70 which has been agglomerated to some extent by the freezing action is removed by scraper 71 and deposited upon surface 72. It will be noted that the agglomerated latex 73 thus removed is divided into two portions by means of divider blade 74 and is then guided downward along surface 72 by means of baffles 75 and divider blade 74.

Referring now to FIG. 1, the melt tank 76 is provided on its upper end with chute 77. The surface 72 and baffles 75 are joined at their lower ends to the upper end of chute 77 thereby providing means for transferring the agglomerated latex from the scraper 71 to the melt tank 76. A partition 78 divides melt tank 76 into two compartments 79 and 80 and chute 77 into two chute portions 81 and 82. The lower portion of divider blade 74 is attached to the upper portion of partition 78 by a hinged connection 83, thereby allowing divider blade 74 to be adjusted to any point along scraper 71. This arrangement provides for the division and transfer of any desired proportion of the agglomerated latex to either compartment of melt tank 76.

A suitable heating medium such as steam is supplied to the bottom of compartments 79 and 80 via conduits 90 and 91, respectively, for thawing the agglomerated latex therein. The storage tank 92 is provided with an inlet conduit 89 leading to a source (not shown) of synthetic ruber latex having a relatively small particle size. A latex blend of agglomerated latex having a relatively large average particle size and latex having a relatively small particle size is continuously prepared in compartment 79 by withdrawing stripped latex having a relatively small average particle size from storage tank 92 via conduit 93 and forcing the same by means of pump 94 via conduit 95 into compartment 79 where it is blended with the agglomerated latex having a relatively large particle size. The flow ratio controller 96 is operatively connected in a conventional manner with conduit 34, conduit 95 and control valve 97 by connections 98, 99 and 100, respectively, and operates control valve 97 in response to changes in the rate of flow in conduit 34 to thereby maintain the desired flow ratio within conduits 34 and 95, and in this manner continuously prepare a latex blend having a desired ratio of the agglomerated latex to the stripped latex.

The second stage concentrator 101 is a prior art concentrator of a type suitable for thermally concentrating synthetic rubber latices to a high solid content. The general construction and operation of second stage concentrator 101 may be substantially the same as described hereinbefore for first stage concentrator 10. The concentrator 101 is provided with a latex feed inlet 102 in the upper portion thereof, an exhaust conduit 103 leading from the top of the concentrator to exhaust means such as a vacuum pump (not shown) and a conduit 104 provided with valve 105 for withdrawing the contents. When charging concentrator 101, valves 105 and 106 are closed, valves 107 and 108 opened, and agglomerated latex having a relatively large average particle size is withdrawn from compartment 80, passed via conduit 109 to pump 110, and then forced by means of pump 110 through conduit 111, heater 112, conduit 113 and feed inlet 102 into concentrator 101. After introducing the desired quantity of agglomerated latex into concentrator 101, valve 107 is closed, valve 105 is opened, and the latex charge continuously recycled through conduit 111, heater 112, conduit 113, concentrator 101, conduit 104 and portion 114 of conduit 109 by means of pump 110 until concentrated to a desired dry solids content. During the recycling step, a suitable heating fluid such as steam is supplied to and withdrawn from coil 115 in heater 112 by conduits 116 and 117, respectively, thereby continuously heating the latex. Also, concentrator 101 is maintained under a suitable reduced pressure such as 28 inches of mercury vacuum by suction on exhaust conduit 103, thus allowing a portion of the volatile contents (largely water) to evaporate. The vapors are withdrawn from the system via exhaust conduit 103. When the latex is concentrated to a desired solids content, such as about 60 to 65% TSC, valve 108 is closed, valve 106 opened, and the final latex product is withdrawn via conduit 118.

When agglomerating synthetic rubber latex by a low temperature process in accordance with prior art practice, it was taught that in order to prevent irreversible coagulation the latex must be subcooled to a temperature only moderately below its freezing point, i.e., to a temperature only moderately below about 28° F. It was further taught that temperatures as high as $-6°$ F. always caused irreversible coagulation of the latex and thus were to be avoided. In accordance with these teachings, the freezer drum 65 was operated in such a manner that the collected latex film 70 was subcooled at the time of removal by scraper 71 to a temperature only moderately below the freezing point of the latex, such as about 10° F. Under these conditions it was extremely difficult to operate the freezer drum 65 and associated apparatus. For example, the collected latex film 70 was found to cling so tenaciously to freezer drum surface 68 that excessive power requirements were necessary to drive freezer drum 65. Also, freezer drum 65 rotated with an uneven, jerking motion which caused scraper 71 to gouge into the drum surface 68, as well as metal fatigue and eventual failure. In attempting to overcome these mechanical difficulties, it was discovered that although the collected latex film 70 at the time of removal by scraper 71 gave the appearance of being completely frozen, it actually contained unfrozen latex present in interstices within the collected latex film 70. It was further discovered that although this unfrozen latex had been subjected to the same temperature as the remainder of the collected latex film 70, it was not agglomerated to an appreciable extent and thus the overall agglomeration step was not efficient. In addition to the mechanical operating difficulties and inefficient agglomeration, handling difficulties also were present since the particles of collected latex 72 removed by scraper 71 tended to be tacky and could not be passed readily along surfaces 72 and chute portions 81 and 82 to compartments 79 and 80, respectively. It was further discovered that the above mentioned difficulties could be overcome and the agglomeration step made more efficient by operating the freezer drum 65 at substantially lower temperatures than heretofore thought possible, and that when operating under such temperature conditions, the latex was not irreversibly coagulated. In fact, the amount of prefloc formed during the freezing step when operating in accordance with the present invention was substantially the same as when operating at higher temperatures.

In accordance with one embodiment of the present invention, the freezer drum 65 may be operated in such a manner as to collect a latex film 70 by a freezing action on the freezer drum surface 68, and then the collected latex film 70 may be subcooled to a temperature substantially below the freezing point of the latex, i.e., substantially below about 28° F., and at a temperature sufficiently low so as to completely freeze and embrittle the latex. This may be accomplished by maintaining freezer drum surface 68 at such a temperature and at such a speed of rotation that collected latex film 70 is subcooled to a desired low temperature before removal by scraper 71. Good results are obtained when a substantial portion of collected latex film 70 is subcooled prior to removal by scraper 71 to a temperature less than $-10°$ F., but temperatures much lower than $-10°$ F. may be used. For example, temperatures as low as $-40°$ F. may be used satisfactorily. Usually superior results will be obtained when a major portion of the collected latex film 70 is subcooled to a temperature between about $-10°$ F. and $-27°$ F. Extremely good results can generally be obtained with the outside surface of a film at a temperature of about $-17°$ F.

In one of its more specific embodiments, the present invention provides a process for agglomerating small particle size latex into a latex product having a larger average particle size than the latex products, previously produced from latex agglomerated by freezing action. This larger average particle size latex has greater mechanical stability. Also, in using the preferred low temperatures of the present invention, the film of latex frozen on the moving surface is embrittled and can therefore be readily removed without mechanical difficulties. The foregoing are advantages of an unobvious nature which make the preferred practice of the present invention of great practical value in a single freezing step process. On the other hand, in the environment of the specific process disclosed herein, the preferred exceedingly low freezing temperatures have an especial advantage in addition to those enumerated. Since small particle size latex on being subjected for the first time to freezing action under the preferred low temperatures of the present invention is agglomerated to a larger particle size than in processes disclosed in the prior art, agglomerated latex recycled in the preferred freezing process disclosed in the present application has a larger average particle size. As a result the first concentration step is acting upon a latex of larger average particle size and the refreezing of the recycled latex is again acting on a larger average particle size latex. It will be apparent that the results of the first freezing step, the first concentration step and the repeated freezing of this larger particle size latex, and even including the second stage concentration step, are all cumulative in their effect. The well known phenomenon of larger particle size latex agglomerating more rapidly than small particle size latex is thus an agent in the preferred practice of the present invention for producing a latex blend and a final latex product of extremely large average particle size and uniform distribution of particle size never before produced.

The refrigerant supplied to freezer drum 65 via trunnions 66 may be liquefied ammonia when using the prefered range of temperature. However, particularly when a lower temperature is desired, a refrigerant such as a suitable liquefied gaseous hydrocarbon, e.g., methane, ethane, propane, and mixtures thereof, or other suitable refrigerants may be used. When operating the freezer drum 65 to obtain the preferred temperature range, it is usually preferred to rotate the freezer drum 65 at such a speed that the collected latex film 70 is about $\frac{1}{16}$ to $\frac{1}{8}$ inch in thickness. When the collected latex film 70 is of such a thickness, then it may be readily subcooled to a desired temperature such as −10° F. to −27° F. in a period of time substantially less than one minute and usually within about 20–40 seconds. Thus, when the freezer drum has a diameter of about 4 feet, then usually the speed of rotation may be about 1 to 2.5 r.p.m. when the temperature of the freezer drum surface 68 is about −18° F. or lower.

While an essentially continuous process is illustrated in the drawings and specifically described herein, it is also possible to use a batch process, or to perform one or more of the various steps of the continuous process on a batch basis such as, for example, pH adjustment, preparation of the synthetic rubber latex blend, or agglomeration of the synthetic rubber latex blend. It also may be convenient in some instances to effect division of the frozen synthetic rubber latex by using two substantially identical freezer drums and melt tanks so arranged that the frozen latex from one drum may be passed to one melt tank and used to prepare the synthetic rubber latex blend for feed to the process, and the frozen synthetic rubber latex from the other drum may be passed to the other melt tank and used as feed to the second stage concentrator. Still other modifications of the process of the invention other than those specifically set forth above are possible without departing from the invention and will be apparent to those skilled in the art.

The synthetic rubber latices to be processed in accordance with the above described procedure may be prepared by conventional polymerization procedures well known in the art such as, for example, conventional processes wherein polymerizable monomeric materials are emulsified in an aqueous medium by means of an emulsifying agent such as a soap or other suitable surface active agent, and the polymerization made to take place at a suitable controlled temperature in the presence of a suitable catalyst and/or other regulating materials. The primary emulsifier preferably should be a long chain fatty acid soap for best results such as sodium or potassium oleate rather than the rosin soaps, while the preferred secondary emulsifier is a polymerized sodium salt of alkyl naphthalene sulfonic acid. The polymerization is generally "shortstopped" at a suitable stage before complete conversion, such as at about 60% conversion, and the unreacted monomer or monomers removed by conventional flashing and/or stripping. As is well understood in the art, it is also advantageous in the preparation of certain synthetic rubber latices, such as SBR latices, to carry out the polymerization at a low temperature such as about 41° F.

Examples of polymerizable materials for use in preparing synthetic rubber latices are the various 1,3-butadienes such as 1,3-butadiene, methyl-2-butadiene-1,3,piperylene, and 2,3-dimethyl-butaduiene-1,3. If desired, the polymerizable material may be a mixture of a 1,3-butadiene, such as 1,3-butadiene, with another polymerizable compound which is capable of forming rubbery copolymers with 1,3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadienes are the aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. The preferred polymerizable material is a mixture of butadiene and styrene wherein the styrene content of the mixture, by weight, is less than about 50%. A recipe giving broad ranges of ingredients in parts by weight for preparing a butadiene-styrene synthetic rubber latex appears below in Table I.

TABLE I

| | |
|---|---|
| Butadiene | 100–50 |
| Styrene | 0–50 |
| Potassium or sodium oleate | 1.5–5.0 |
| Electrolyte [1] | 0.2–1.5 |
| Secondary emulsifier [2] | 0–1.5 |
| Ethylenediamine tetraacetic acid tetra sodium salt [3] | [4] 0–0.10 |
| Sodium hydrosulfite | 0–0.10 |
| Water | 150–250 |
| Sodium formaldehyde sulfoxylate | 0.04–0.20 |
| Diisopropylbenzene hydroperoxide or paramenthane hydroperoxide | 0.05–0.30 |
| Tertiarydodecylmercaptan | 0–0.3 |
| Ferrous sulfate heptahydrate | 0.02–0.04 |
| Versene 100 to complex ferrous sulfate | 0.03–0.06 |
| Shortstop | 0.05–0.20 |

[1] The following electrolytes or mixtures of any two may be used; potassium chloride, sodium chloride, trisodium phosphate, tripotassium phosphate, potassium pyrophosphate, potassium sulfate, sodium sulfate, sodium borate and lithium chloride.
[2] Tamol N, Daxad 11, Nycol (polymerized sodium salts of alkyl naphthalene sulfonic acid).
[3] Sold as Versene 100, a product of Dow Chemical Company; Sequestrene 30A, a product of Alrose Chemical Company; Nullapon BF-13, a product of Antara Chemicals.
[4] In soap solution.

The ranges of ingredients appearing in Table I are satisfactory for preparing general purpose latices. However, in order to prepare fast gelling, high solids latices which are highly satisfactory for use in foamed rubber manufacture, it has been discovered that certain of the ingredients or components thereof must be present in specific amounts or ratios. For example, if the gel time and foam density are to be improved to any significant extent while retaining the desirable properties of the latex, the potassium and sodium contents of the receipe must be carefully balanced. In most instances, this may be accomplished by substituting sodium salts of strong mono or dibasic mineral acids and/or sodium soaps of fatty acids for the corresponding potassium salts and/or soaps present heretofore in sulfoxylate-activated recipes for use in low temperature polymerization processes. It is entirely unexpected that this substitution would result in improved latex and especially since the art has always taught that the above mentioned sodium salts and/or soaps are to be avoided when formulating recipes for use in low temperature polymerization processes.

In accordance with one embodiment of the invention, it has been found that the potassium and sodium content of the recipe ingredients should be present in a ratio of potassium to sodium between 1.0:1.0 and 1.7:1.0 when calculated on a gram atomic weight basis. Even better results will be obtained in most instances when the above mentioned ratio is between 1.2:1.0 and 1.6:1.0, with the best results usually being obtained when the ratio is about 1.4:1.0.

In accordance with another embodiment of the invention, a novel electrolyte is provided for use in low temperature sulfoxylate-activated recipes which comprises a water soluble sodium salt of a strong mono- or dibasic mineral acid such as hydrochloric or sulfuric acid. Sodium chloride has been found to be remarkably effective and far superior to other salts falling within the above defined group. Thus, an electrolyte comprising sodium chloride is preferred. The preferred electrolyte system includes trisodium phosphate, potassium chloride and sodium chloride and, for best results, the components of this electrolyte system should be present in the proportions set forth in preferred recipes appearing in Table II hereinafter.

In many instances, preferred results are obtained when using a fatty acid soap of sodium or potassium as an emulsifier in combination with the above described electrolyte. Preferably, such soaps are used as primary emulsifiers while a suitable polymerized sodium salt of alkyl naphthalene sulfonic acid such as Daxad 11 is used as the secondary emulsifier. The use of sodium containing soaps enhances the effect of the above electrolyte and results in shorter gel time and lower foam density for a given electrolyte.

Specific examples of sulfoxylate-activated recipes with varying amounts and ratios of potassium and sodium containing ingredients appear below in Table II. All ingredients are given in parts by weight.

the proper balance of potassium and sodium in recipes in accordance with the invention is based on the ratio of disassociated potassium and sodium ions present in the aqueous polymerization medium. When using this method, errors apparently arising from the presence of largely undisassociated substances such as alkali metal soaps of fatty acids or alkali metal salts of tribasic acids are avoided. Thus, it is preferred that a recipe provide a ratio of disassociated potassium and sodium ions between the ratio present when using recipe E of Table II and the ratio present when using recipe B of Table II.

TABLE II

| Ingredient | Recipe A | Recipe B | Recipe C | Recipe D | Recipe E | Recipe F |
|---|---|---|---|---|---|---|
| Water | 180 | 180 | 180 | 180 | 180 | 180 |
| Butadiene | 70 | 70 | 70 | 70 | 70 | 70 |
| Styrene | 30 | 30 | 30 | 30 | 30 | 30 |
| Potassium Oleate | 3.5 | 3.5 | 3.5 | 3.5 | 3.5 | None |
| Sodium Oleate | None | None | None | None | None | 3.5 |
| Electrolyte: | | | | | | |
|   Trisodium phosphate | 0.20 | 0.20 | 0.20 | 0.20 | 0.20 | 0.20 |
|   Potassium chloride | 0.05 | 0.15 | 0.10 | 0.20 | None | None |
|   Sodium chloride | 0.15 | 0.05 | 0.10 | None | 0.20 | 0.20 |
| Secondary Emulsifier[1] | 0.40 | 0.40 | 0.40 | 0.40 | 0.40 | 0.40 |
| Tertiary dodecyl mercaptan | 0.07 | 0.07 | 0.07 | 0.07 | 0.07 | 0.07 |
| Diisopropylbenzene | 0.04 | 0.04 | 0.04 | 0.04 | 0.04 | 0.04 |
| Ethylenediamine Tetraacetic Acid Tetrasodium salt | 0.054 | 0.054 | 0.054 | 0.054 | 0.054 | 0.054 |
| Sodium Hydrosulfite | 0.015 | 0.015 | 0.015 | 0.015 | 0.015 | 0.015 |
| Ferrous Sulfate Heptahydrate | 0.012 | 0.012 | 0.012 | 0.012 | 0.012 | 0.012 |
| Sodium Formaldehyde Sulfoxylate | 0.05 | 0.05 | 0.05 | 0.05 | 0.05 | 0.05 |
| Shortstop[2] | 0.10 | 0.10 | 0.10 | 0.10 | 0.10 | 0.10 |
| Ratio of Potassium to Sodium[3] | 1.2:1.0 | 1.7:1.0 | 1.4:1.0 | 1.9:1.0 | 1.1:1.0 | |

[1] Daxad 11 (polymerized sodium salts of alkyl napthalene sulfonic acid).
[2] Sodium dimethyl dithiocarbonate.
[3] Calculated on a gram atomic weight basis.

Referring now to Table II, recipe D contains 0.2 part trisodium phosphate and 0.2 part potassium chloride as an electrolyte and potassium oleate as a primary emulsifier. The ingredients of recipe D have a ratio of potassium to sodium of about 1.9:1.0 when calculated on a gram atomic weight basis. Thus, recipe D does not contain a proper balance of sodium and potassium. However, by substituting only 0.05 part of sodium chloride for 0.05 part of the potassium chloride in recipe D, then the ratio of potassium to sodium when calculated on a gram atomic weight basis becomes 1.7:1.0, as shown for recipe B, and the recipe is satisfactory for producing fast gelling latex. Similarly, satisfactory recipes may be obtained by substituting 0.1, 0.15 and 0.20 part of sodium chloride for the potassium chloride of recipe D, as shown by recipes C, A, and E, respectively. When 0.20 part, i.e., all of the potassium chloride is replaced with sodium chloride and all the potassium oleate is replaced by sodium oleate, then the resulting latex has an unsatisfactory low temperature viscosity for ease of handling, storage and processing. However, the latex is extremely fast gelling and has a very low foam density. Thus, it may be used in instances where the problem of high low temperature viscosity can be overcome.

The latices produced from recipes in accordance with the invention tend toward higher viscosities as the sodium salt or soap content is increased. Thus, a ratio of potassium to sodium of about 1.2:1.0 to 1.6:1.0 is preferred since relatively low viscosities are obtained in combination with very satisfactory gel times and foam densities. A ratio of 1.4:1.0 produces a latex which is outstanding in viscosity, gel time, and foam density and thus it is generally preferred. The agglomeration and concentration method described herein results in a lower viscosity high solids latex than it is possible to produce by other economic methods. As a result, the tendency toward higher viscosities in the high solids latices of the present invention may be controlled and latex of acceptable viscosity produced in instances where it would not be possible by other methods.

In some instances, a more accurate method of defining

Even better results will be obtained when using a recipe providing about the ratio of disassociated potassium and sodium ions existing in the aqueous polymerization medium when using recipe C of Table II. If desired, the ratio of disassociated potassium and sodium ions existing in an aqueous polymerization medium when using the various recipes of Table II may be calculated from readily available information and by procedures well known to those skilled in the art.

The stripped synthetic rubber latex in storage tank 92 may be synthetic rubber latex having a relatively small average particle size as compared with the average particle size of the frozen and thawed agglomerated synthetic rubber latex and it may be prepared from recipes described herein following conventional low temperature polymerization techniques and procedures. The stripped synthetic rubber latex in storage tank 92 may contain about 18–20% solids, e.g., the latex may have a solids content as present in the original latex withdrawn from conventional polymerization reactors (60% conversion) and after flashing and/or stripping. However, the latex may be concentrated, if desired, to a higher solids content such as 35–45%. It usually is not possible to concentrate small particle size synthetic rubber latex to a higher concentration. By first concentrating the stripped 18–20% synthetic rubber latex to about 35–45% TSC, the amount of water to be removed in the first concentration step is reduced and thus the load on the first stage concentrator 10 will not be as great. However, no appreciable advantage is obtained by first concentrating the latex within storage tank 92 provided the capacity of first stage concentrator 10 is suffiently high.

When it is desired to reduce and control the viscosity of the final latex product and to stabilize the latex feed to the first concentration step of the continuous process, it is essential that the synthetic rubber latex blend described herein be supplied as the feed to first stage concentrator 10. For example, if an attempt is made to recycle only unfrozen, the stability characteristics of the latex feed are such that prohibitive amounts of prefloc will be formed during the recycling process. Should an attempt be made to prepare low viscosity high solids synthetic rubber latex by a "once through" process using only small average particle size latex as the feed, i.e., by first stage concentration of the small average particle size latex 35–45% TSC, pH adjustment, agglomeration by freezing, thawing and then concentrating the resulting once-frozen and once-thawed latex, it is impossible to prevent a large amount of prefloc from forming during first stage concentration. Also, the end latex product has a relatively high viscosity, the viscosity of the product cannot be controlled, and it is not possible to obtain the extremely wide distribution of particle size characteristic of the final latex product prepared by the continuous process described herein.

The synthetic rubber latex blend described herein must contain frozen and thawed agglomerated synthetic rubber latex having a relatively large average particle size and synthetic rubber latex having a relatively small average particle size, with the agglomerated latex being present in a quantity such as to produce a synthetic rubber latex blend of improved mechanical stability. Some improvement is noted in blends containing amounts as small as about 5 parts by weight (on a dry solids basis) of the agglomerated synthetic rubber latex for each 100 parts of the synthetic rubber latex blend, and amounts up to about 85 parts by weight may be used. However, better results are obtained when the latex blend comprises by weight and on a dry solids basis about 35–65 parts of the agglomerated synthetic rubber latex for each 100 parts of synthetic rubber latex blend, with the best results usually being obtained with about one part of the frozen and thawed agglomerated latex for each part of the synthetic rubber latex having a relatively small average particle size. Such blends of synthetic rubber latices exhibit a greatly improved mechanical stability which is not fully explainable at the present time, and which is apparently due to some synergistic effect. The synthetic rubber latex blends referred to herein, unless otherwise indicated, are by weight and on a dry solids basis.

While it is preferred that the low temperatures disclosed herein may be used in freeze agglomerating the low solids small average particle size latex, this is not always essential. For example, in some instances, somewhat higher temperatures which are sufficient to freeze agglomerate the latex may be used since the fast gelling properties are usually not adversely affected.

The following specific example further illustrates the invention:

*Example*

SBR latices were prepared from recipes A through E of Table II following conventional low temperature polymerization procedures. The polymerizations were each carried out under the same conditions (41° F.) and were each short-stopped at 60% conversion. The unreacted monomers were then removed by the usual flashing and stripping steps. The resulting small average particle size SBR latices had solids content of about 18.1% and each was then treated as described below.

Low solids latex after conventional flashing and stripping of unreacted monomers was pumped into storage tank 92 and used in preparing the latex blend in compartment 79. The latex blend prepared in compartment 79 and charged to first stage concentrator 10 via conduit 19, pump 20, conduit 21, heater 22, conduit 23 and inlet 11, was a 50/50 blend by weight and on a dry solids basis of the original fresh low solids small average particle size SBR latex in storage tank 92 and the frozen and thawed agglomerated SBR latex having a relatively large average particle size fed to compartment 79 via chute portion 81. The resulting latex blend had a solids content of about 26.6%.

The latex blend was recycled in first stage concentrator 10 until concentrated to 55% TSC. During this concentration step, the concentrator 10 was operated at a temperature of about 120° F., the heat being supplied to the latex blend by means of heater 22, and under 28 inches of mercury vacuum by means of suction on exhaust conduit 12. The vaporized water was withdrawn via exhaust conduit 12. After concentration to 55% TSC, the latex blend was withdrawn from concentrator 10 and passed via conduit 28 to freezer feed tank 29. Practically no prefloc was formed during first stage concentration.

The latex blend was withdrawn from freezer feed tank 29, passed to pump 31 via conduit 30, and then forced by means of pump 31 via conduit 32, precooler 33, and conduit 34 into pH adjustment tank 35. The latex blend was cooled to about 40° F. in precooler 33 by means of indirect heat exchange with the liquid ammonia supplied thereto via conduits 37 and 38. The feed rate in conduit 34 was controlled by means of valve 39 operated by controller 40 as hereinbefore described. The pH of the latex blend feed to tank 35 was 10.0 and carbon dioxide was passed via conduit 46 into the latex blend 44 at a controlled rate and in quantities sufficient to reduce the pH to 8.2. During pH adjustment, the latex blend 44 in tank 35 was agitated by means of agitator 45.

The latex blend after pH adjustment was passed from tank 35 via overflow spout 47 into container 48. The pH of the overflowing latex blend was measured by means of pH electrode 52 immersed in the latex blend 56, with the carbon dioxide feed rate to tank 35 being controlled by means of valve 49 in conduit 46. Valve 49 was operated by pH controller 53 in response to changes in the pH of the latex as hereinbefore described.

The pH adjusted latex blend was allowed to overflow via conduit 51 to freezer drum tank 60 and was agglomerated to a relatively large average particle size by means comprising freezer drum 65. The freezer drum 65 was about 4 feet in diameter and was rotated at about 1 r.p.m. Liquid ammonia was passed through interior 69 of freezer drum 65 and expanded therein under reduced pressure to thereby maintain the temperature of the freezer drum surface 68 at about −27° F. By operating the freezer drum 65 under such conditions, as the drum rotated a film of latex 70 of about 1/16–1/8 inch in thickness was collected by a freezing action on the portion of drum surface 68 immersed in latex 61, and the film of latex so collected was then subcooled upon passing from latex 61 and before reaching scraper blade 71 to a temperature substantially below its freezing point, i.e., substantially below about 28° F. It was found that upon reaching the scraper 71, the portion of the latex film 70 at the drum surface 68 was −.27° F. and the top surface was −17° F., the average temperature of latex film 70 being about −22° F. The latex film 70 was completely frozen and embrittled to such an extent as to allow easy removal from drum surface 68 by a scraping action.

The frozen agglomerated latex blend was removed from the freezer drum surface 68 by scraper 71, divided into two equal portions by means of divider blade 74, and guided down surfaces 72 by means of divider blade 74, baffles 75, and chute portions 81 and 82 into compartments 79 and 80, respectively. The frozen agglomerated latex blend was thawed in compartments 79 and 80 by means of steam injected into the contents thereof via conduits 90 and 91, respectively.

A latex blend was prepared in compartment 79 for feeding to first stage concentration by controlling the ratio of feed rates in conduits 34 and 95 with means comprising flow ratio controller 96, which operated valve 97 as previously described. The latex blend contained by weight and on a dry solids basis 50 parts of the frozen and thawed agglomerated latex having a relatively large particle size for each 100 parts of the prepared latex blend. The resulting latex blend was passed to the first stage concentration step.

The frozen and thawed agglomerated latex blend in compartment 80 was passed to pump 110 via conduit 109, and charged to second stage concentrator 101 via conduit 111, heater 112, conduit 113, and inlet 102. The second stage concentrator 101 was operated in the manner of first stage concentrator 10. The frozen and thawed agglomerated latex blend was recycled until a solids content of 60% TSC was reached and then the final product withdrawn via conduit 118.

Following preparation as described above, each of the resulting high solids latices was tested to determine its gelling time and foam density, as follows:

DETERMINATION OF GEL TIME

The procedure for preparing solutions and running the gel time test on each latex was as follows:

A. *Equipment*

(1) Constant temperature bath maintained at 35±0.5° C.
(2) Vacuum type windshield wiper motor fitted with arm and drive mechanism capable of giving a 4" reciprocating (up-down) stroke.
(3) A tapered coil agitator.
(4) Test tubes—29 x 200 mm. size.
(5) One graduated 5 ml. pipette and one 2 ml. pipette.
(6) A stopwatch.

B. *Reagents*

(1) 40% zinc oxide dispersion prepared in the following manner:

| Material | Parts by Weight, Dry | Parts by Weight, Wet |
|---|---|---|
| Zinc Oxide (AZO-ZZZ-66) | 40.00 | 40.00 |
| Daxad 11 | 2.00 | 2.00 |
| NH$_3$ Solution (28%) | | 0.575 |
| Water | | 57.425 |
| | 42.00 | 100.000 |

Procedure: Add all ingredients to ball mill jar and mill for 24 hours.

(2) 20% sodium silicofluoride dispersion prepared in the following manner:

| Formula A | Parts by Weight, Dry | Parts by Weight, Wet |
|---|---|---|
| Material: | | |
| Sodium Silicofluoride | 35.00 | 35.00 |
| Bentonite Clay | 3.50 | 3.50 |
| Water | | 61.50 |
| | 38.50 | 100.00 |

Procedure: Add all ingredients to ball mill jar and grind for 24 hours.

20% sodium silicofluoride dispersion:

Material:   Grams
   Formula A above _____ 100
   Water _____ 75

C. *Preparation of Latex*

(1) Thoroughly mix approximately 500 cc. of latex and then strain through a double thickness of dampened cheesecloth.
(2) Run an accurate solids determination on the strained latex.
(3) Dilute the latex to 58% total solids content with water and store in a tightly capped bottle.

$$\text{Grams water/100 grams latex} = \frac{\text{Original percent TSC} - 58.1}{0.58}$$

D. *Procedure*

(1) Weigh 50 grams of 58% latex into a tared test tube (29 x 100 mm.).
(2) Place the test tube containing latex in a constant temperature bath so that latex level is below the bath level and arrange the agitator so that the stroke extends from bottom of test tube to above the latex level in the tube and agitate for 10 minutes. This is done to assure constant 35° C. temperature of latex.
(3) Continue to agitate and add 2.7 ml. of 40% zinc oxide dispersion.
(4) Follow the zinc oxide addition with 2 ml. of 20% sodium silicofluoride dispersion.
(5) Start the stop-watch as soon as sodium silicofluoride is added.
(6) Continue agitation until sample gels, then stop the stop-watch. The latex/zinc oxide/sodium silicofluoride mixture will go through a period of increasing viscosity until the gelling point is reached. When the gelling time is reached, the agitator will be firmly imbedded in the gelled latex. The tests should be repeated to assure accuracy.

DETERMINATION OF FOAM DENSITY

The following procedure was used for the determination of foam density of each high solids latex. Foam density is a measure of the frothability of the latex. The lower the foam density the easier it is to produce foamed rubber articles from the latex.

(1) Dilute the latex sample to a total solids content of 60.0% if necessary. Take a sufficient volume of sample so that at least 200 grams of diluted latex will be obtained.
(2) Weigh 200 grams of the diluted latex (60% TSC) into the mixing bowl of a model N-50 Hobart mixer.
(3) Mix, at number 3 speed for 5 minutes, in the Hobart mixer.
(4) With a spoon or spatula, fill a tared calibrated 400 ml. beaker with the foam level with the top. Carefully work out all air pockets from the beaker of foam.
(5) Weigh beaker of foam and calculate foam density as follows.

Calculation:
  Where
    A = weight of beaker and foam
    B = weight of beaker
    V = calibrated volume of beaker level with top
    D = foam density grams/liter $$D = \frac{(A-B) \times 1000}{V}$$

The following gel times in seconds and foam densities in grams/liter were obtained for latices A through E of Table II upon testing by the above procedure:

| From Table II | Gel Time, sec. | Foam Density, g./l. |
|---|---|---|
| A | 105 | 75 |
| B | 160 | 110 |
| C | 125 | 95 |
| D | 200 | 125 |
| E | 75 | 55 |
| F | 10-20 | 30-40 |

It is apparent from the above data that providing a suitable potassium and sodium balance during polymerization results in a greatly improved latex for manufacture of foamed-latex sponge rubber products. For example, the electrolyte in recipe D contains 0.2 part trisodium phosphate, 0.2 part potassium chloride and no sodium chloride and the resulting latex has a gel time of 200 seconds and a foam density of 125 g./l. which is unsatisfactory. If only 0.05 part of sodium chloride is substituted for 0.05 part of the potassium chloride in recipe D as in recipe B, then the gel time and foam density improve markedly, i.e., are only 160 seconds and 110 g./l., respectively. If additional amounts of sodium chloride are substituted for the potassium chloride of recipe D, then further improvement in gel time and foam density is noted as indicated by the data for recipes A, C and E. Also, replacing the entire potassium chloride content with sodium chloride and the potassium oleate with sodium oleate results in a latex characterized by an extremely short gel time and very low foam density, as indicated by the data for recipe F.

It was found that the latex viscosity increased with increasing sodium chloride content. For example, the recipe F latex was thick and viscous and it did not have low temperature viscosity characteristics suitable for usual handling, shipping and storage. However, due to its remarkable gel time and foam density properties, recipe F latex may be used in specialized applications. The recipe E latex also was somewhat viscous at temperatures below about 60° F. and it is not generally preferred for this reason due to the handling, shipping and storage problems present at low temperatures. However, latex E has a satisfactory viscosity at temperatures somewhat above 60° F.

Latices prepared from recipes A, B, C and D all had satisfactory viscosity characteristics, although latex D exhibited unsatisfactory foam density and gel time properties. For example, latex D had a viscosity of only 150 centiposes or less at 60% TSC and 845 centiposes at 65% TSC. The viscosity of latices A, B and C were somewhat higher, the change in viscosity varying directly with the sodium chloride content, but all were well within acceptable limits for foamed-latex sponge rubber manufacture and yet they also had greatly improved gel times and foam densities. For these reasons, latices A, B and C are preferred for most purposes. Latex C is especially desirable since it combines relatively low viscosity with highly satisfactory gel time and foam density properties. Latex C thickens at a temperature only about 20° F. higher than latex D.

The freeze agglomeration and thermal concentration process disclosed herein results in a substantially lower viscosity high solids latex than is possible by other methods. Thus, the over-all process described herein is especially useful in preparing the fast gelling, high solids latices of the invention which tend toward higher viscosities. Often, other methods of producing high solids latex by the recipes of the invention are entirely unsatisfactory due to the inability to control the viscosity.

Addition or substitution of large amounts of trisodium phosphate and sodium borate in Recipe D does not result in a satisfactory improvement in gel time and foam density. The improvement seems to be dependent upon the addition of a water soluble sodium salt of a strong mono or dibasic mineral acid. Sodium chloride is especially effective and is preferred over other salts.

What is claimed is:

1. In a process for producing high solids synthetic rubber latex including the steps of preparing low solids synthetic rubber latex having a relatively small average particle size by emulsion polymerization in an aqueous medium of at least one polymerizable material selected from the class consisting of conjugated diolefins and mixtures of conjugated diolefins and ethylenically unsaturated monomers, agglomerating the latex to a relatively large average particle size by freezing and thawing and concentrating the agglomerated latex to a high solids content, the improvement which comprises polymerizing the polymerizable material by a low temperature polymerization process using a sulfoxylate polymerization recipe including potassium and sodium-containing compounds, the ingredients of the recipe having a ratio of potassium to sodium between 1.0:1.0 and 1.7:1.0 when calculated on a gram atomic weight basis.

2. The synthetic rubber latex produced by the process of claim 1.

3. In a process for producing high solids styrene-butadiene rubber latex including the steps of preparing low solids styrene-butadiene rubber latex having a relatively small average particle size by emulsion polymerization in an aqueous medium of a polymerizable mixture of styrene and butadiene, agglomerating the latex to a relatively large average particle size by freezing and thawing and concentrating the agglomerated latex to a high solids content, the improvement which comprises polymerizing the mixture of styrene and butadiene by a low temperature polymerization process using a sulfoxylate polymerization recipe including potassium and sodium-containing compounds, the ingredients of the recipe having a ratio of potassium to sodium between 1.2:1.0 and 1.6:1.0 when calculated on a gram atomic weight basis.

4. In a process for producing high solids styrene-butadiene rubber latex including the steps of preparing low solids styrene-butadiene rubber latex having a relatively small average particle size by emulsion polymerization in an aqueous medium of a polymerizable mixture of styrene and butadiene, agglomerating the latex to a relatively large average particle size by freezing and thawing and concentrating the agglomerated latex to a high solids content, the improvement which comprises polymerizing the mixture of styrene and butadiene by a low temperature polymerization process using a sulfoxylate polymerization recipe including potassium and sodium-containing compounds, the ingredients of the recipe having a ratio of potassium to sodium between 1.0:1.0 and 1.7:1.0 when calculated on a gram atomic weight basis.

5. The process of claim 1 wherein the sulfoxylate polymerization recipe includes an electrolyte comprising trisodium phosphate, potassium chloride and sodium chloride and an emulsifier comprising a fatty acid soap of an alkali metal selected from the class consisting of potassium and sodium.

6. The process of claim 4 wherein the sulfoxylate polymerization recipe includes an electrolyte comprising trisodium phosphate, potassium chloride and sodium chloride and an emulsifier comprising a fatty acid soap of an alkali metal selected from the class consisting of potassium and sodium and a polymerized sodium salt of alkyl naphthalene sulfonic acid.

7. In a process for producing high solids styrene-butadiene rubber latex including the steps of preparing low solids styrene-butadiene rubber latex having a relatively small average particle size by emulsion polymerization in an aqueous medium of a polymerizable mixture of styrene and butadiene, agglomerating the latex to a relatively large average particle size by freezing and thawing and concentrating the agglomerated latex to a high solids content, the improvement which comprises polymerizing the mixture of styrene and butadiene by a low temperature polymerization process using a sulfoxylate polymerization recipe including potassium and sodium containing compounds and having an electrolyte comprising a salt selected from the class consisting of the water soluble sodium salts of strong mono-basic and di-basic mineral acids, the ingredients of the recipe having a ratio of potassium to sodium between 1.0:1.0 and 1.7:1.0 when calculated on a gram atomic weight basis.

8. The process of claim 4 wherein the sulfoxylate polymerization recipe comprises sodium chloride as an electrolyte.

9. The process of claim 4 wherein the sulfoxylate polymerization recipe comprises trisodium phosphate, potassium chloride and sodium chloride as an electrolyte.

10. The process of claim 4 wherein the sulfoxylate polymerization recipe comprises a fatty acid soap of an alkali metal selected from the class consisting of potassium and sodium as an emulsifier.

11. In a process for preparing sponge rubber including the steps of foaming synthetic rubber latex and gelling the foamed latex in the presence of a gelling agent, the latex being prepared by emulsion polymerization in an aqueous medium of at least one polymerizable material selected from the class consisting of conjugated diolefins and mixtures of conjugated diolefins and ethylenically unsaturated monomers employing a low temperature polymerization process and a sulfoxylate polymerization recipe including potassium and sodium-containing compounds, agglomerating the latex to a relatively large average particle size by freezing and thawing and concentrating the agglomerated latex to a high solids content, the improvement comprising reducing the gell time of the foamed latex by foaming a latex polymerized from a recipe having a ratio of potassium to sodium between 1.0:1.0 and 1.7:1.0 when calculated on a gram atomic weight basis.

12. In a process for preparing sponge rubber including the steps of foaming synthetic rubber latex and gelling the foamed latex in the presence of a gelling agent, the latex being prepared by emulsion polymerization in an aqueous medium of a polymerizable mixture of butadiene and styrene employing a low temperature polymerization process and a sulfoxylate polymerization recipe including potassium and sodium-containing compounds, agglomerating the latex to a relatively large average particle size by freezing and thawing and concentrating the agglomerated latex to a high solids content, the improvement comprising reducing the gell time of the foamed latex by foaming a latex polymerized from a recipe having a ratio of potassium to sodium between 1.0:1.0 and 1.7:1.0 when calculated on a gram atomic weight basis.

References Cited in the file of this patent

UNITED STATES PATENTS

| | | |
|---|---|---|
| 2,187,146 | Calcott et al. | Jan. 16, 1940 |
| 2,716,107 | Brown | Aug. 23, 1955 |
| 2,839,483 | Howland et al. | June 17, 1958 |
| 2,897,167 | Dreisbach et al. | July 28, 1959 |

FOREIGN PATENTS

| | | |
|---|---|---|
| 758,622 | Great Britain | Oct. 3, 1956 |

UNITED STATES PATENT OFFICE
CERTIFICATE OF CORRECTION

Patent No. 3,130,171                              April 21, 1964

John D. Sutherland, Jr.

It is hereby certified that error appears in the above numbered patent requiring correction and that the said Letters Patent should read as corrected below.

Column 1, line 49, after "feeds" strike out the comma; line 56, for "The" read -- Then, the --; column 2, line 7, after "serum" insert -- is --; column 3, line 50, after "using" insert -- a --; column 4, line 31, after "including" strike out "a"; column 5, line 28, for "an" read -- and --; column 7, line 34, for "ruber" read -- rubber --; column 8, line 27, for "a", first occurrence, read -- the --; column 9, line 6, after "drum" insert -- 65 --; line 55, for "butaduiene" read -- butadiene --; column 11, TABLE II, under the heading "Ingredient", line 12 thereof, for "Dilisopropylbenzene" read -- Di-isopropylbenzene Hydroperoxide --; same table, footnote 2 thereof, for "dithiocarbonate" read -- dithiocarbamate --; column 12, line 73, for "unfrozen, the" read -- unfrozen latex, the --; column 15, line 67, for "58.1" read -- 58.0 --; line 72, for "100" read -- 200 --.

Signed and sealed this 27th day of October 1964.

(SEAL)
Attest:

ERNEST W. SWIDER                         EDWARD J. BRENNER
Attesting Officer                        Commissioner of Patents